US011987211B2

(12) United States Patent
Li et al.

(10) Patent No.: US 11,987,211 B2
(45) Date of Patent: May 21, 2024

(54) ELECTRIC PEDAL FOR AUTOMOBILE

(71) Applicant: Shanghai Essenway Technology Development Co., Ltd., Shanghai (CN)

(72) Inventors: Jiancheng Li, Shanghai (CN); Guilan Zhou, Shanghai (CN)

(73) Assignee: Shanghai Essenway Technology Development Co., Ltd., Shanghai (CN)

( * ) Notice: Subject to any disclaimer, the term of this patent is extended or adjusted under 35 U.S.C. 154(b) by 0 days.

(21) Appl. No.: 18/344,808

(22) Filed: Jun. 29, 2023

(65) Prior Publication Data
US 2023/0356661 A1 Nov. 9, 2023

Related U.S. Application Data

(63) Continuation of application No. PCT/CN2022/092265, filed on May 11, 2022.

(30) Foreign Application Priority Data

May 8, 2022 (CN) .......................... 202210493764.3
May 8, 2022 (CN) .......................... 202221081202.X

(51) Int. Cl.
*B60R 3/02* (2006.01)
*B60R 3/00* (2006.01)

(52) U.S. Cl.
CPC ................ *B60R 3/02* (2013.01); *B60R 3/002* (2013.01)

(58) Field of Classification Search
CPC ................................... B60R 3/02; B60R 3/002
See application file for complete search history.

(56) References Cited

U.S. PATENT DOCUMENTS

| | | | |
|---|---|---|---|
| 2005/0151340 A1 | 7/2005 | Leitner | |
| 2008/0290626 A1* | 11/2008 | Leitner | B60R 3/02 280/166 |
| 2019/0294196 A1* | 9/2019 | Liu | G05G 1/40 |
| 2020/0156547 A1* | 5/2020 | Watson | B60R 3/02 |
| 2020/0282913 A1* | 9/2020 | Qing | B60R 3/02 |
| 2022/0371516 A1* | 11/2022 | Ye | B60Q 1/323 |

FOREIGN PATENT DOCUMENTS

| | | |
|---|---|---|
| CN | 104385989 A | 3/2015 |
| CN | 204659599 U | 9/2015 |
| CN | 206358076 U | 7/2017 |
| CN | 209719421 U | 12/2019 |
| CN | 210258224 U | 4/2020 |

\* cited by examiner

*Primary Examiner* — Bryan A Evans
(74) *Attorney, Agent, or Firm* — Mei & Mark LLP; Manni Li

(57) ABSTRACT

An electric pedal for an automobile comprises a driving support, a driving mechanism, and a pedal. The driving support and driving mechanism are both mounted on the same side of a bottom of an automobile body. The driving support comprises a first transmission mechanism and a first connecting rod, a front end of the first connecting rod is fixedly connected to the pedal, and the first transmission mechanism drives the first connecting rod to be extended and retracted. The driving shaft of the driving mechanism is directly fixedly connected to the first transmission mechanism and drives the first transmission mechanism to be extended and retracted, such that the first connecting rod is extended and retracted.

10 Claims, 3 Drawing Sheets

ELECTRIC PEDAL FOR AUTOMOBILE

CROSS-REFERENCE TO RELATED APPLICATIONS

The subject application is a continuation of PCT/CN2022/092265 filed on May 11, 2022, which in turn claims priority on Chinese Patent Application Nos. CN202210493764.3 and CN202221081202.X, both filed on May 8, 2022 in China. The contents and subject matters of the PCT international stage application and Chinese priority applications are incorporated herein by reference.

TECHNICAL FIELD

The present invention relates to automobile pedals, particularly, an electric pedal for an automobile.

BACKGROUND ART

There are two types of automobile pedals, the fixed pedal and the retraction-extension type pedal. As the names suggest, the fixed pedal cannot retract or extend as a pedal and is always extended on a side wall of an automobile body after being mounted, while the retraction-extension type pedal has a retraction-extension supporting structure and can retract when not used and extend when in use. When the pedal is retracted, the lower end of the side portion of the automobile body does not protrude out of the outer side of the automobile body such that the automobile will not collide with an obstacle when passing through a narrow road section, thereby avoiding damage to the pedal.

However, in the current technology, due to unreasonable design of the retraction-extension supporting structure, the retraction-extension type pedal is subject to a lot of defects.

Firstly, when the pedal is retracted, a driven supporting structure is dropped down or loosened because of failure of tightening. Second, the output end of an electric motor and a driving shaft are in complex gear transmission, so the manufacturing precision must be high and is difficult to guarantee, the machining cost of a gear transmission mechanism is high, and gear transmission is likely to generate abnormal sound. Thirdly, relative sliding (mostly referring to rotating relative to the driving arm) is generated between the driving shaft and a driving arm due to the fact that connection therebetween is not firm, thereby generating abnormal sound and noise. Fourthly, a transmission shaft and a connecting member thereof are fixed by using a locking bolt, and since the shaft is in clearance fit with a shaft hole, there is a gap, such that shock impact resistance is weak, and a deformation fracture is generated. Fifthly, the transmission shaft and the corresponding shaft hole mostly use copper-plated iron shaft sleeves such that a lubricating effect is poor after long-term abrasion, and abnormal sound is generated along with continuous loss of the lubricating effect. Sixthly, a shock pad is mounted between the driving arm and a supporting arm, and the driving shaft is subjected to large torsion, such that stability of a driving mechanism is low, and a service life of the drive mechanism is short. U.S. patent Ser. No. 10/649,483B2 discloses an electric pedal for an automobile, which has these defects as described above, and needs to be improved.

SUMMARY OF INVENTION

The present invention provides an electric pedal for an automobile that solves the technical problems in the existing electric pedal for an automobile as mentioned above. The driving shaft of the driving mechanism of the electric pedal of the present invention is directly connected to the first transmission mechanism of the driving support such that a traditional gear transmission mechanism is omitted, manufacturing cost is reduced, and generation of abnormal sound is reduced. An angle between the upper surface of the pedal and the ground is 3 to 8 degrees when the pedal is retracted, no horizontal outward force is generated, and it may be ensured that the pedal is retracted in place.

To achieve the above objective, the present invention provides an electric pedal for an automobile comprising a driving support, a driving mechanism, and a pedal, wherein the driving support and the driving mechanism are both mounted on the same side of the bottom of an automobile body. The driving support comprises a first transmission mechanism and a first connecting rod, a front end of the first connecting rod is fixedly connected to the pedal, and the first transmission mechanism drives the first connecting rod to be extended and retracted.

In the present invention, the driving shaft of the driving mechanism is directly fixedly connected to the first transmission mechanism and drives the first transmission mechanism to be extended and retracted such that the first connecting rod is extended and retracted. When the first connecting rod moves from the retracted state to the extended state, the pedal is driven to move towards a lower side of an outer side of the automobile body. An angle between an upper surface of the pedal and a ground in the retracted state is 3 to 8 degrees, and in the extended state, the upper surface of the pedal is substantially parallel to the ground.

In the electric pedal for an automobile of the present invention, the driving mechanism comprises a driving motor mounted at the bottom of the automobile body, a gear box is mounted at an output end of the driving motor, and the gear box is connected to the first transmission mechanism by means of the driving shaft.

In the electric pedal for an automobile of the present invention, the first transmission mechanism comprises a first connecting base, a first driving arm, and a first supporting arm. The driving shaft penetrates the first connecting base and is fixedly connected to one end of the first driving arm, the other end of the first driving arm is rotationally connected to the first connecting rod, and two ends of the first supporting arm are rotationally connected to the first connecting base and the first connecting rod respectively.

In the electric pedal for an automobile of the present invention, the first connecting rod is provided with a connecting lug, the connecting lug is provided with a first shaft hole and a second shaft hole that are perpendicular to the connecting lug, and the axis of the first shaft hole is parallel to the axis of the second shaft hole. A connecting plate is arranged on the first connecting base, the connecting plate is provided with a third shaft hole and a fourth shaft hole that are perpendicular to the connecting plate, and the axis of the third shaft hole is parallel to the axis of the fourth shaft hole.

In the present invention, one end of the first supporting arm is fixedly provided with a first transmission shaft, and the other end thereof is fixedly provided with a second transmission shaft. The first transmission shaft on the first supporting arm cooperates with the first shaft hole in the first connecting rod, and the second transmission shaft on the first supporting arm cooperates with the third shaft hole in the first connecting base.

In the present invention, one end of the first driving arm is fixedly provided with a third transmission shaft, and the third transmission shaft on the first driving arm cooperates with the second shaft hole in the first connecting rod. The driving shaft is fixedly connected to the other end of the first driving arm, and the driving shaft cooperates with the fourth shaft hole in the first connecting base.

In the electric pedal for an automobile of the present invention, two ends of the first supporting arm are provided with a fifth shaft hole for mounting the first transmission shaft and a sixth shaft hole for mounting the second transmission shaft in a penetrating manner, and the axis of the fifth shaft hole is parallel to the axis of the sixth shaft hole.

In the present invention, one end of the first driving arm is provided with a seventh shaft hole for mounting the third transmission shaft in a penetrating manner, the other end of the first driving arm is provided with an eighth shaft hole for mounting the driving shaft in a penetrating manner, and the axis of the seventh shaft hole is parallel to the axis of the eighth shaft hole.

In the electric pedal for an automobile of the present invention, two ends of the first supporting arm each are provided with a transmission shaft rotating device, one end of the first driving arm is provided with a transmission shaft rotating device, and the other end of the first driving arm is provided with a driving shaft locking device.

In the electric pedal for an automobile of the present invention, the transmission shaft rotating device comprises a shaft sleeve, two ends of the first transmission shaft, two ends of the second transmission shaft, and two ends of the third transmission shaft each rotationally cooperate with the shaft sleeve, a middle section of the first transmission shaft is in interference fit with the first shaft hole of the first connecting rod in a locked manner, a middle section of the second transmission shaft is in interference locking fit with the third shaft hole of the first connecting base in a locked manner, and a middle section of the third transmission shaft is in interference fit with the second shaft hole of the first connecting rod in a locked manner.

In the electric pedal for an automobile of the present invention, the driving shaft locking device comprises a first locking bolt and a square fixing block, a middle section of the driving shaft is provided with flat grooves, and the end, connected to the driving shaft, of the first driving arm is provided with a first through hole perpendicular to and coaxial with the eighth shaft hole. The square fixing block is inserted into the eighth shaft hole from one side of the first driving arm, the square fixing block cooperates with the flat grooves in the driving shaft, the square fixing block is provided with a first threaded hole coaxial with same, and the first locking bolt is inserted into the first through hole from the other side of the first driving arm and is in threaded fit with the first threaded hole.

In the electric pedal for an automobile of the present invention, a shaft sleeve is arranged in each of the fifth shaft hole, the sixth shaft hole and the seventh shaft hole, and a shaft sleeve is also arranged in the fourth shaft hole.

The electric pedal for an automobile of the present invention further comprises at least one driven support, where the driven support comprises a second transmission mechanism and a second connecting rod, and a front end of the second connecting rod is fixedly connected to the pedal. The driving support drives the second transmission mechanism to be synchronously extended and retracted by means of the pedal, such that the second connecting rod is synchronously extended and retracted.

In the electric pedal for an automobile of the present invention, the structure of the driven support is consistent with the driving support, that is, the driven support is composed of a second connecting base, a second driving arm, a second supporting arm, and a second connecting rod except the driving mechanism and the driving shaft, and the driving shaft is replaced with a fourth transmission shaft.

In the electric pedal for an automobile of the present invention, the side of the first connecting rod facing the first supporting arm and the side of the second connecting rod facing the second supporting arm each are provided with a sinking groove, and a shock pad is mounted in the sinking groove.

In the electric pedal for an automobile of the present invention, a T-shaped groove is provided in the pedal, a connecting block having a T-shaped section is mounted in the T-shaped groove, grooves cooperating with the connecting block are provided at a front end of the first connecting rod and a front end of the second connecting rod, and a second threaded hole for locking the pedal is provided in the connecting block.

In the electric pedal for an automobile of the present invention, when the pedal is in a retracted position and an extended position, an acute angle is formed between the upper surface of the pedal and the ground.

In the electric pedal for an automobile of the present invention, an angle of the upper surface of the pedal being inclined inwards is 0 to 5 degrees.

With the above technical solutions, the present invention has the following advantages.

Firstly, the present invention has a special supporting structure, which ensures that the retracted state and the extended state of the pedal are in a horizontal state or a nearly horizontal state, ensures that the pedal may be retracted in place, and avoids the situation that since the pedal is extended during a running process of the automobile, trafficability of the automobile body is affected, and dangers are caused. In particular, the angle between the upper surface of the pedal and the ground is 3 to 8 degrees when the pedal is in the retracted state, no horizontal outward force is generated, and it may be ensured that the pedal is retracted in place.

Secondly, the output shaft of the driving mechanism of the present invention is the driving shaft, which replaces a gear transmission mechanism for transmission, and has a good self-locking function.

Thirdly, in the present invention, the driving shaft and the first driving arm are locked by means of the first locking bolt, such that a front surface of the square fixing block presses the flat grooves in the driving shaft, thereby ensuring firmness of connection between the driving shaft and the first driving arm.

Fourthly, in the present invention, all the transmission shafts and the corresponding supporting arms or the driving arms are fixed in an interference locking manner, such that the transmission shafts and the driving arms are integrated, and are firmer and more resistant to shock impact than the manner by which the locking bolts are fixed in the shaft holes of the corresponding supporting arms or the driving arms.

Fifthly, in the present invention, the shaft sleeves made of special materials are arranged between all the transmission shafts and the shaft holes, and between all the driving shaft and the shaft holes, the shaft sleeves have good self-lubricating effects, and abnormal sound caused by poor lubricating effects after long-term use is avoided.

Sixthly, in the present invention, each of the first connecting rod and the second connecting rod is fixed to the pedal by means of the connecting block, the pedal is provided with the T-shaped groove for mounting the connecting block, and the front ends of the first connecting rod and the second connecting rod are both provided with the grooves cooperating with the corresponding connecting block, such that stress between the pedal and the first connecting rod, and stress between the pedal and the second connecting rod are not completely depended on the bolt, the stress condition is transferred to an outer wall of the connecting block, and whether mounting positions of the driving support and the driven support are correct or not may also be detected after the connecting block is used for auxiliary connection.

Figure 1:
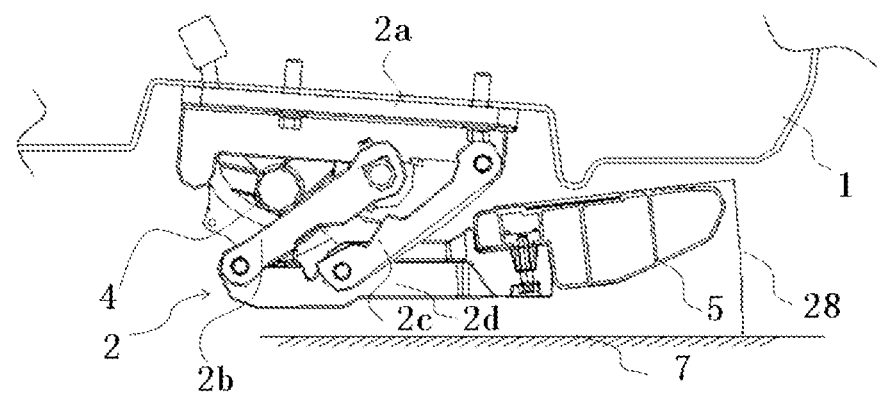
FIG. 1 shows the driving support in a retracted state in the electric pedal for automobile of the present invention.

Reference numbers used in the figures refer to the following structures: 1—automobile body; 2—driving support; 2a—first connecting base; 2b—first driving arm; 2c—first supporting arm; 2d—first connecting rod; 3—driven support; 3a—second connecting base; 3b—second driving arm; 3c—second supporting arm; 3d—second connecting rod; 4—driving mechanism; 4a—driving motor; 4b—gear box; 4c—driving shaft; 4c1 and 4c2—flat groove; 5—pedal; 5a—T-shaped groove; 6—connecting lug; 7—ground; 8—connecting plate; 10—first shaft hole; 11—second shaft hole; 12—third shaft hole; 13—fourth shaft hole; 14a—fifth shaft hole; 14b—sixth shaft hole; 15—seventh shaft hole; 16—eighth shaft hole; 18—first transmission shaft; 19—second transmission shaft; 20—third transmission shaft; 21—fourth transmission shaft; 22—shaft sleeve; 23—first locking bolt; 25—first threaded hole; 26—second threaded hole; 27—first through hole; 28—angle between upper surface of pedal and ground in retracted state of pedal; 29—square fixing block; 30—shaft sleeve; 31—shock pad; 32—angle of upper surface of pedal being inclined inwards; and 33—connecting block.

DETAILED DESCRIPTION OF THE INVENTION

As shown in FIGS. 1-7, the present invention provides an electric pedal for an automobile. As shown in the figures, the electric pedal comprises a driving support 2, a driving mechanism 4 and a pedal 5, wherein the driving support 2 and the driving mechanism 4 are both mounted on the same side of a bottom of an automobile body 1. The driving support 2 comprises a first transmission mechanism and a first connecting rod 2d, a front end of the first connecting rod 2d is fixedly connected to the pedal 5, and the first transmission mechanism drives the first connecting rod 2d to be extended and retracted. A driving shaft 4c of the driving mechanism 4 is directly fixedly connected to the first transmission mechanism and drives the first transmission mechanism to be extended and retracted, such that the first connecting rod 2d is extended and retracted. When the first connecting rod 2d is extended, the pedal 5 is driven to move towards a lower side of an outer side of the automobile body 1, an angle 28 between an upper surface of the pedal 5 and a ground 7 when the pedal is retracted is 3-8 degrees, and when the pedal is extended, the upper surface of the pedal is substantially parallel to the ground 7.

Figure 2:
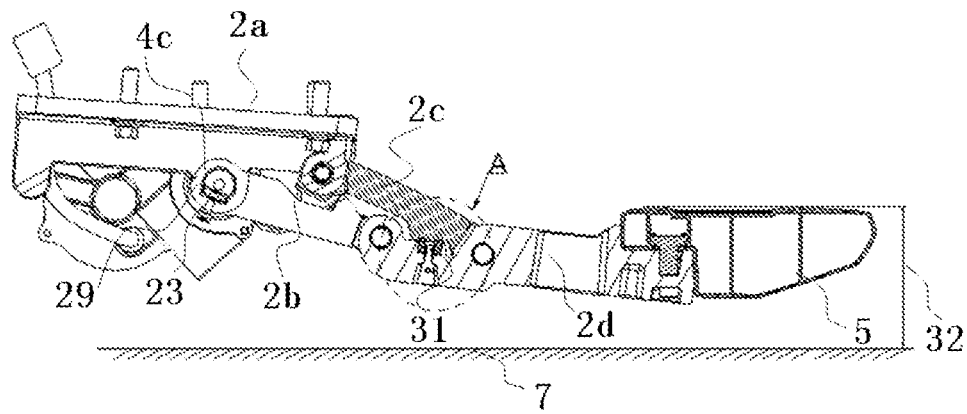
FIG. 2 shows the driving support in an extended state in the electric pedal for automobile of the present invention.
Figure 4:
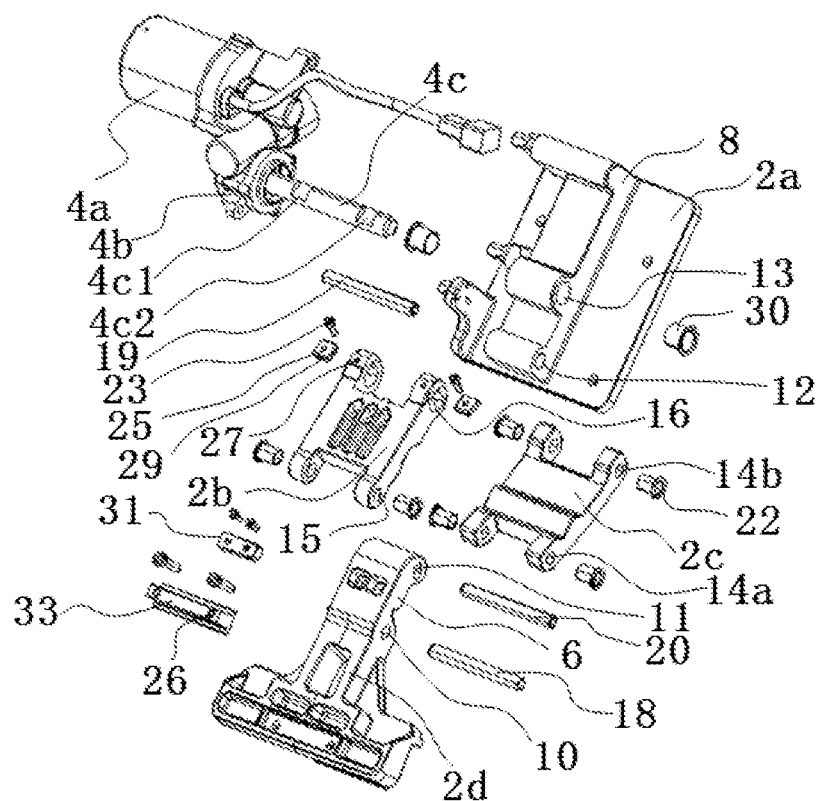
FIG. 4 shows a three-dimensional breakdown structure of the driving support in the electric pedal for automobile of the present invention.

As shown in FIGS. 1, 2, and 4, in the present invention, the driving mechanism 4 comprises a driving motor 4a mounted at the bottom of the automobile body 1, a gear box 4b is mounted at an output end of the driving motor 4a, and the gear box 4b is connected to the first transmission mechanism by means of the driving shaft 4c.

In the present invention, the first transmission mechanism comprises a first connecting base 2a, a first driving arm 2b and a first supporting arm 2c, where the driving shaft 4c penetrates the first connecting base 2a and is fixedly connected to one end of the first driving arm 2b, the other end of the first driving arm 2b is rotationally connected to the first connecting rod 2d, and two ends of the first supporting arm 2c are rotationally connected to the first connecting base 2a and the first connecting rod 2d respectively.

In the present invention, the first connecting rod 2d is provided with a connecting lug 6, the connecting lug 6 is provided with a first shaft hole 10 and a second shaft hole 11 that are perpendicular to the connecting lug 6, and the axis of the first shaft hole 10 is parallel to the axis of the second shaft hole 11. A connecting plate 8 is arranged on the first connecting base 2a, the connecting plate 8 is provided with a third shaft hole 12 and a fourth shaft hole 13 that are perpendicular to the connecting plate 8, and the axis of the third shaft hole 12 is parallel to the axis of the fourth shaft hole 13. One end of the first supporting arm 2c is fixedly provided with a first transmission shaft 18, and the other end is fixedly provided with a second transmission shaft 19. The first transmission shaft 18 on the first supporting arm 2c cooperates with the first shaft hole 10 in the first connecting rod 2d, and the second transmission shaft 19 on the first supporting arm 2c cooperates with the third shaft hole 12 in the first connecting base 2a. One end of the first driving arm 2b is fixedly provided with a third transmission shaft 20, and the third transmission shaft 20 on the first driving arm 2b cooperates with the second shaft hole 11 in the first connecting rod 2d. The driving shaft 4c is fixedly connected to the other end of the first driving arm 2b, and the driving shaft 4c cooperates with the fourth shaft hole 13 in the first connecting base 2a.

In the present invention, two ends of the first supporting arm 2c are provided with a fifth shaft hole 14a for mounting the first transmission shaft 18 and a sixth shaft hole 14b for mounting the second transmission shaft 19 in a penetrating manner, and the axis of the fifth shaft hole 14a is parallel to the axis of the sixth shaft hole 14b. One end of the first driving arm 2b is provided with a seventh shaft hole 15 for mounting the third transmission shaft 20 in a penetrating manner, the other end of the first driving arm 2b is provided with an eighth shaft hole 16 for mounting the driving shaft 4c in a penetrating manner, and the axis of the seventh shaft hole 15 is parallel to the axis of the eighth shaft hole 16.

In the present invention, two ends of the first supporting arm 2c each are provided with a transmission shaft rotating device, one end of the first driving arm 2b is provided with a transmission shaft rotating device, and the other end of the first driving arm is provided with a driving shaft locking device.

In the present invention, the transmission shaft rotating device comprises a shaft sleeve 22, two ends of the first transmission shaft 18, two ends of the second transmission shaft 19 and two ends of the third transmission shaft 20 each rotationally cooperate with the shaft sleeve 22, a middle section of the first transmission shaft 18 is in interference fit with the first shaft hole 10 of the first connecting rod 2d in a locked manner, a middle section of the second transmission shaft 19 is in interference locking fit with the third shaft hole 12 of the first connecting base 2a in a locked manner, and a middle section of the third transmission shaft 20 is in interference fit with the second shaft hole 11 of the first connecting rod 2d in a locked manner.

In the present invention, the driving shaft locking device comprises a first locking bolt 23 and a square fixing block 29, a middle section of the driving shaft 4c is provided with flat grooves 4c1 and 4c2, and the end, connected to the driving shaft 4c, of the first driving arm 2b is provided with a first through hole 27 perpendicular to and coaxial with the eighth shaft hole 16. The square fixing block 29 is inserted into the eighth shaft hole 16 from one side of the first driving arm 2b, the square fixing block 29 cooperates with the flat grooves 4c1 and 4c2 in the driving shaft 4c, the square fixing block 29 is provided with a first threaded hole 25 coaxial with same, and the first locking bolt 23 is inserted into the first through hole 27 from the other side of the first driving arm 2b and is in threaded fit with the first threaded hole 25.

In the present invention, a shaft sleeve 22 is arranged in each of the fifth shaft hole 14a, the sixth shaft hole 14b and the seventh shaft hole 15, and a shaft sleeve 30 is also arranged in the fourth shaft hole 13.

Figure 3:
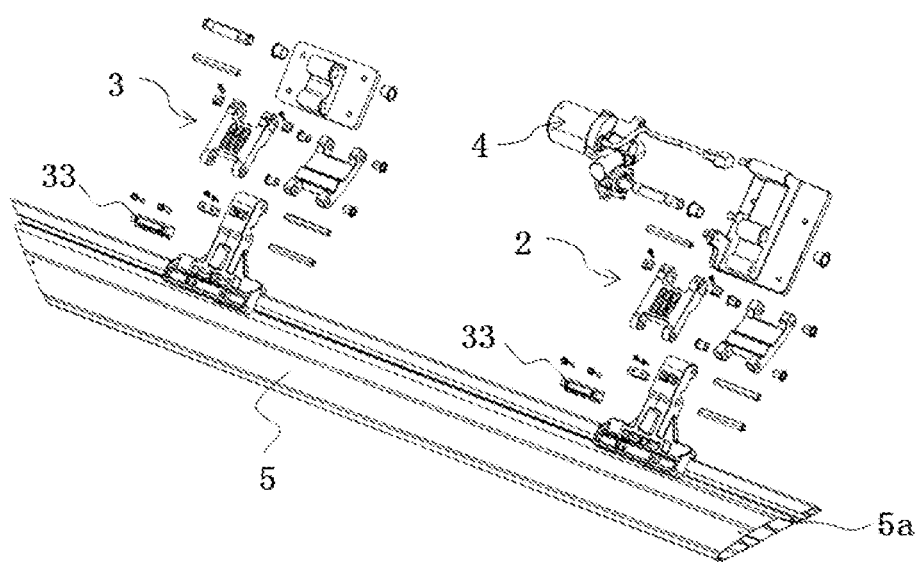
FIG. 3 shows a three-dimensional breakdown structure of the electric pedal for automobile of the present invention.
Figure 5:
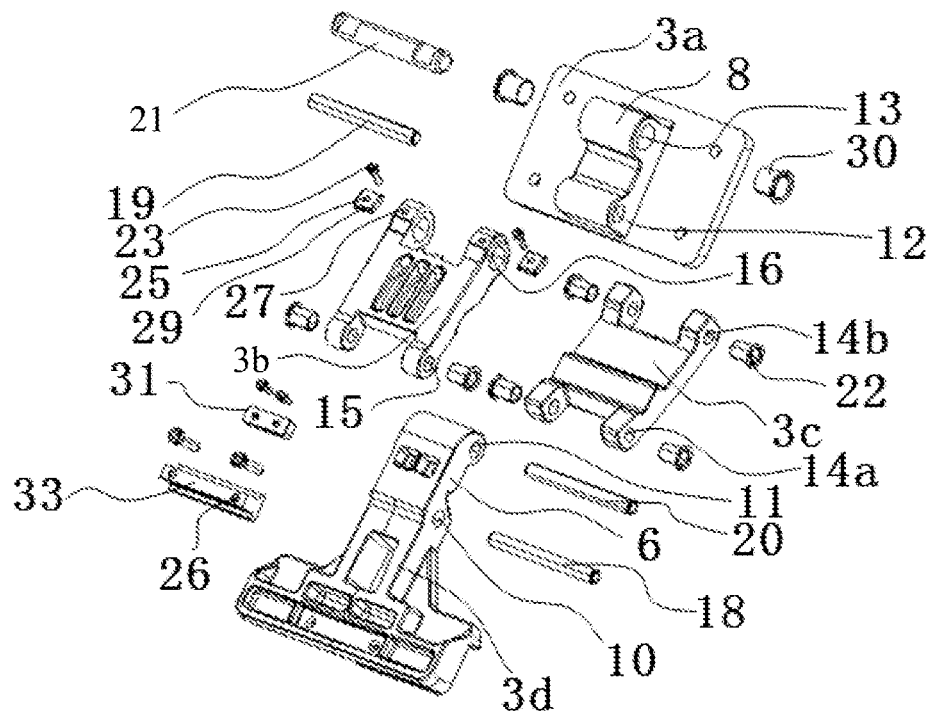
FIG. 5 shows a three-dimensional breakdown structure of the driven support in the electric pedal for automobile of the present invention.

As shown in FIGS. 3 and 5, the electric pedal for an automobile of the present invention further comprises at least one driven support 3 where the driven support 3 comprises a second transmission mechanism and a second connecting rod 3d, and a front end of the second connecting rod 3d is fixedly connected to the pedal 5. The driving support 2 drives the second transmission mechanism to be synchronously extended and retracted by means of the pedal 5, such that the second connecting rod 3d is synchronously extended and retracted.

With reference to FIG. 4, the structure of the driven support 3 is consistent with the driving support 2, that is, the driven support 3 is composed of a second connecting base 3a, a second driving arm 3b, a second supporting arm 3c and a second connecting rod 3d except the driving mechanism 4 and the driving shaft 4c, and the driving shaft 4c is replaced with a fourth transmission shaft 21.

Figure 6:
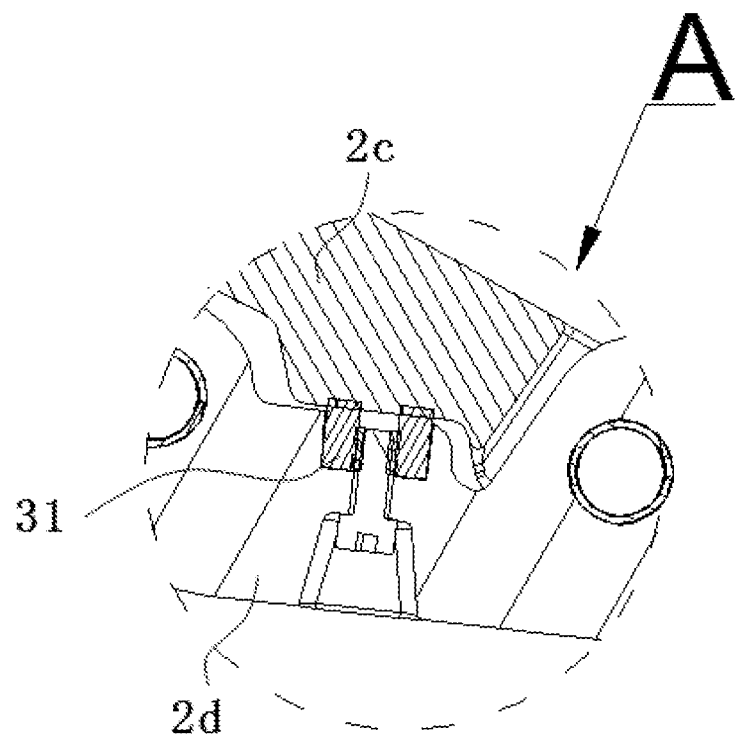
FIG. 6 shows an enlarged view of portion A in FIG. 2.
Figure 7:
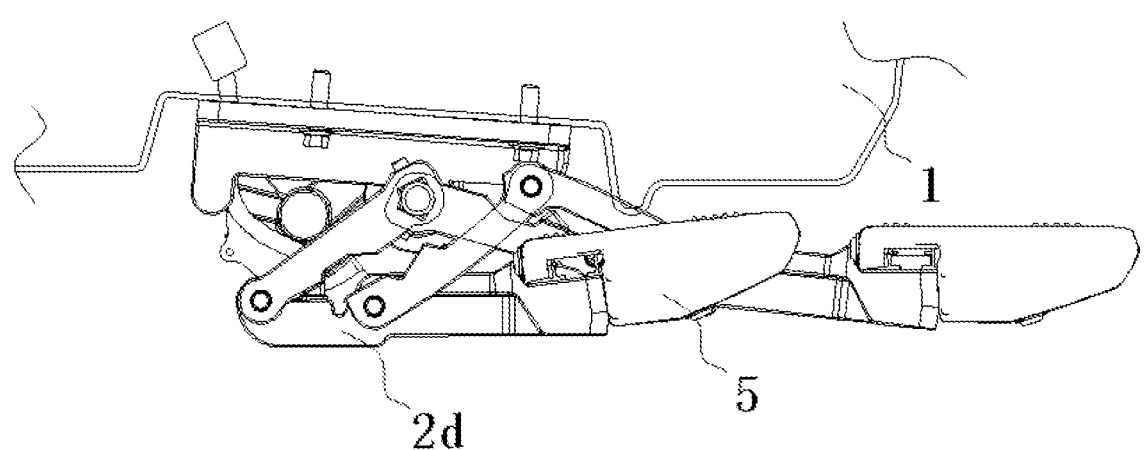
FIG. 7 shows the movement of the driving support from a retracted position to an extended position in the electric pedal for automobile of the present invention.

With reference to FIG. 6, the side of the first connecting rod 2d facing the first supporting arm 2c and the side of the second connecting rod 3d facing the second supporting arm 3c each are provided with a sinking groove, and a shock pad 31 is mounted in the sinking groove.

With reference to FIGS. 3-5, in the present invention, a T-shaped groove 5a is provided in the pedal 5, a connecting block 33 having a T-shaped section is mounted in the T-shaped groove 5a, grooves cooperating with the connecting block 33 are provided at a front end of the first connecting rod 2d and a front end of the second connecting rod 3d, and a second threaded hole 26 for locking the pedal 5 is provided in the connecting block 33.

Preferably, when the pedal 5 is in a retracted position and an extended position, an acute angle is formed between the upper surface of the pedal and the ground 7.

Preferably, an angle 32 of the upper surface of the pedal 5 being inclined inwards is 0 to 5 degrees.

In one embodiment of the present invention, the electric pedal for an automobile of the present invention has a special supporting structure design, wherein the driving support 2 is directly connected to the driving shaft 4c of the driving mechanism 4, that is, the output shaft of the electric motor is the driving shaft 4c, which replaces a gear transmission mechanism, and overcomes the defect that the gear transmission mechanism drives the pedal 5 to be retracted and extended in a transmission manner, which is likely to generate abnormal sound. The manufacturing cost of the whole automobile pedal is greatly reduced due to omission of the complex gear transmission mechanism. The driving motor 4a of the driving mechanism 4 is provided with a gear box 4b and has a good self-locking function, which cooperates with a special supporting structure to ensure that the pedal 5 is always in a horizontal position or a nearly horizontal position during extension and retraction. In particular, when the pedal is in the retracted position, the angle between the upper surface of the pedal 5 and the ground is 3-8 degrees, no horizontal outward force is generated, that is, the situation that the pedal 5 is not tightened due to the horizontal outward force of a traditional retraction-extension type pedal 5 is avoided, and the situation that since the pedal 5 is extended due to the fact that the pedal fails to be tightened in a running process of the automobile, trafficability of the automobile body is affected, and consequently, dangers are generated is avoided.

In the present invention, fixed connection between the driving shaft 4c and the first driving arm 2b is firm, specifically, the driving shaft locking device cooperates with the flat grooves 4c1 and 4c2 provided in the driving shaft 4c, and the first locking bolt 23 is used for locking, such that the front surface of the square fixing block 29 presses the flat grooves 4c1 and 4c2 in the driving shaft 4c, thereby ensuring firmness of the connection between the driving shaft 4c and the first driving arm 2b, and effectively avoiding relative sliding caused by connection loosening between the driving shaft 4c and the first driving arm 2b during long-term use. All the transmission shafts and the corresponding supporting arms or the driving arms are fixed by means of the first locking bolt 23, such that the transmission shafts and the supporting arms or the driving arms are integrated, and are firmer than the manner by which the transmission shafts are simply assembled in the shaft holes of the corresponding supporting arms or driving arms in a tightening manner. The shaft sleeves 22 and 30 made of special materials are arranged between all the transmission shafts and the shaft holes, and between the driving shaft 4c and the shaft holes, the shaft sleeves 22 and 30 have good self-lubricating effects, and therefore, abnormal sound caused by poor lubricating effects after long-term use is avoided. The first connecting rod 2d is connected to the pedal 5 by means of the connecting block 33, such that stress between the pedal 5 and the first connecting rod 2d is not completely depended on the bolt, and the stress condition is transferred to an outer wall of the connecting block 33.

In addition, the angle between the upper surface of the pedal 5 and the ground facing inwards is 3 to 8 degrees in the retracted state, such that the situation that since splashing broken stone sundries are retained on the electric pedal in the running process of the automobile and the electric pedal has sundries when the pedal is extended, usability of the electric pedal is affected, and dangers are generated during treading is avoided. The angle between the upper surface of the pedal 5 and the ground facing inwards is 3 to 8 degrees, a gap between the electric pedal and the automobile body is reduced, the pedal 5 is in the retracted state to facilitate hiding of the electric pedal, and the vision of the hidden electric pedal is better.

The special supporting structure design is used in the present invention, the driving support 2 is connected to the driving mechanism 4, and the driving mechanism 4 drives the driving support 2 to be retracted or extended. As shown in the state in FIG. 1, the first driving arm 2b is attached to the first supporting arm 2c, in this case, the pedal 5 mounted at the front end of the first connecting rod 2d is in a horizontal state or an angle between the pedal and a horizontal direction is very small, the stress of the first connecting rod 2d is gravity of the first connecting rod and force which is vertically downward and applied by the pedal 5, and all the force is vertical. When the driving support 2 is retracted in place, under influence of self-locking force of the gear box 4b, no force pulling outwards is generated or pulling force is very small, the self-locking force of the gear box 4b fails to be overcome, the risk that the driving support 2 is extended or extended to a certain degree is avoided, and a matching gap between the pedal 5 and the automobile body 1 is basically consistent.

In the present invention, the first connecting base 2a, the first connecting rod 2d, the first driving arm 2b, and the first supporting arm 2c form a stable four-connecting-rod mechanism, which may achieve stable extension and retraction of the first connecting rod 2d under driving of the driving mechanism 4 so as to ensure the attitude of the pedal 5 in the retracted and extended states, that is, the upper surface of the pedal 5 is ensured to be substantially parallel to the ground, thereby ensuring that the force exerted on the first connecting rod 2d by the pedal 5 is vertically downward or substantially vertically downward in the retracted or extended state, and especially, the situation that the driving support 2 fails to be retracted in place in the retracted state due to generation of the horizontal outward force is avoided.

In the present invention, two ends of the first supporting arm 2c each are provided with a transmission shaft rotating device, one end of the first driving arm 2b is provided with a transmission shaft rotating device, and the other end of the first driving arm is provided with a driving shaft locking device.

It should be emphasized that as the driving shaft 4c employs a detachable mounting manner and the corresponding driving arm, the mounting firmness of the driving shaft 4c directly affects the stability of an action of the driving support 2, and if mounting is not firm, abnormal sound may also be caused. Therefore, the driving shaft 4c locking device is arranged for the driving shaft 4c in the present invention.

In the present invention, as the torque borne by the driving shaft 4c after the driving shaft is fixedly connected to the first driving arm 2b is much greater than that of other transmission shafts, the driving shaft 4c locking device has a firmer locking function relative to the transmission shaft locking device, where the square fixing block 29 and the first locking bolt 23 are mounted on two sides of the first driving arm 2b respectively, and the front surface of the square fixing block 29 and the flat groove 4c1 and 4c2 in the driving shaft 4c may be pressed more tightly by locking the first locking bolt 23, such that the driving shaft 4c and the first driving arm 2b are fixed more firmly.

In the present invention, the shaft sleeve 22 is arranged in each of the fifth shaft hole 14a, the sixth shaft hole 14b and the seventh shaft hole 15, and the shaft sleeve 30 is also arranged in the fourth shaft hole 13.

When the driving shaft 4c and various transmission shafts cooperatively operate with the corresponding shaft holes, a lubrication medium is usually required between the shafts and interiors of the holes for lubrication. Due to the fact that both the hole arms and the shafts are made of metal materials, under the condition that no continuous lubricating medium is supplemented, abrasion is caused by long-term friction between the shafts and the shaft holes, and abnormal sound is generated. In order to improve wear resistance of the shafts and the shaft holes is improved, special wear-resistant treatment needs be performed, such that a manufacturing process is more complex, and manufacturing cost is relatively increased. Therefore, the shaft sleeves 22 and the shaft sleeve 30 are mounted in all the shaft holes respectively, and the shaft sleeves 22 and the shaft sleeve 30 are made of special materials having self-lubricating effects, and since parts of the shaft sleeves 22 and the shaft sleeve 30 are relatively small, different materials may be used for other components, manufacturing and machining are easy, and a large amount of cost is reduced.

In the present invention, the side of the first connecting rod 2d facing the first supporting arm 2c and the side of the second connecting rod 3d facing the second supporting arm 3c each are provided with the sinking groove, and the shock pad 31 is mounted in the sinking groove.

It should be noted that the driving support 2 should have good stability when the pedal 5 stays in the retracted position or the extended position, and collision and impact between various components should be reduced as much as possible when the pedal reaches the retracted position or the extended position. The shock pad 31 is mounted on an inner side of the first connecting rod 2d, and is specifically towards one side of the first supporting arm 2c. When the pedal 5 is in the fully extended position, the first supporting arm 2c compresses the shock pad 31, in this case, the first connecting rod 2d, the shock pad 31, and the first supporting arm 2c are tightly attached, such that self-locking is achieved when the driving support 2 is in the extended positioning state, and the shock pad 31 reduces collision between the first supporting arm 2c and the first connecting rod 2d while ensuring the first connecting rod 2d to be tightly attached to the first supporting arm 2c. When the electric pedal is treaded for use, the gravity of downward treading is decomposed into force borne by the first connecting rod 2d and the first supporting arm 2c, stress of the first driving arm 2b is reduced, and the torsion on the driving shaft 4c of the first driving arm 2b is reduced, thereby improving stability of the driving mechanism 4, and prolong a service life. When the pedal 5 is retracted, the shock pad 31 on the first connecting rod 2d is also compressed by the first driving arm 2b, and the first connecting rod, the shock pad, and the first supporting arm are tightly attached, such that the driving support 2 is in another positioning state.

The driving support 2 should have good stability when the pedal 5 is in the extended position, and should have a self-locking function when reaching the extended position. Specifically, when the pedal 5 is in the fully extended position, the first supporting arm 2c compresses the shock pad 31, and in this case, the first connecting rod 2d, the shock pad 31, and the first supporting arm 2c are tightly attached, such that the self-locking is achieved when the driving support 2 and the driven support 3 are in the extended positioning state, a self-locking mechanism is formed at the corresponding position of the shock pad 31, and a user may step on the electric side pedal in a self-locking state.

In the present invention, the T-shaped groove 5a is provided in the pedal 5, the connecting block 33 having the T-shaped section is mounted in the T-shaped groove 5a, the grooves cooperating with the connecting block 33 are provided at the front end of the first connecting rod 2d and the front end of the second connecting rod 3d, and a second threaded hole 26 for locking the pedal 5 is provided in the connecting block 33.

The first connecting rod 2d and the pedal 5 are connected by means of the connecting block 33, such that stress between the pedal 5 and the first connecting rod 2d is not completely depended on the bolt, and the stress condition is transferred to the outer wall of the connecting block 33.

The angle between the upper surface of the pedal 5 and the ground facing inwards is 3-8 degrees in the retracted state, and in the extended state, the upper surface of the pedal is substantially parallel to the ground.

In an ideal state, when the pedal 5 is in the retracted position or in the extended position, the upper surface of the pedal is kept horizontal with the ground, and specifically, the acting force applied to the first connecting rod 2d by the pedal 5 when external configuration is retracted may be kept vertically downward without generating horizontal force towards the outer side so as to ensure that the driving support 2 is tightened.

Preferably, when the pedal 5 is in the retracted position and the extended position, an acute angle is formed between the upper surface of the pedal and the ground.

In the case where use is not affected, the upper surface of the pedal 5 may form a smaller angle with the ground when the pedal is in the retracted position and in the extended position.

More specifically, when the pedal 5 is in the retracted position, the angle of the upper surface of the pedal 5 being inclined inwards is 3-8 degrees, and in the extended position, the angle of the upper surface of the pedal 5 being inclined inwards is 0-5 degrees.

In order to ensure reliability of the pedal 5, an inclination direction of the upper surface of the pedal 5 is preferably inclined inwards, and when a foot sole of the user is wet and slippery, the user will not roll over because the upper surface of the pedal 5 is tilted outward. In order to ensure beauty of the extended state of the pedal 5, that is, the inclination angle of the pedal 5 is not too large to affect an appearance of the whole automobile, the angle of the upper surface of the pedal 5 being inclined inwards should be as small as possible, and the angle is preferably 0-5 degrees in this example.

In another embodiment of the present invention, the present invention has a special supporting structure design, wherein the driving support 2 is directly connected to the driving shaft 4c of the driving mechanism 4, that is, the output shaft of the electric motor is the driving shaft 4c, which replaces a gear transmission mechanism, and overcomes the defect that the gear transmission mechanism drives the pedal 5 to be retracted and extended in a transmission manner, which is likely to generate abnormal sound. The manufacturing cost of the whole automobile pedal 5 is greatly reduced due to omission of the complex gear transmission mechanism. The driving motor 4a of the driving mechanism 4 is provided with a gear box 4b and has a good self-locking function, which cooperates with a special supporting structure to ensure that the pedal is always in a horizontal position or a nearly horizontal position during extension and retraction. In particular, when the pedal is in the retracted position and in the horizontal position, the acting force applied to the supporting structure by the gravity of the pedal will not generate horizontal outward force, that is, the situation that the pedal 5 is not tightened due to the horizontal outward force of a traditional retraction-extension type pedal 5 is avoided, and the situation that since the pedal 5 is extended due to the fact that the pedal fails to be tightened in a running process of the automobile, trafficability of the automobile body is affected, and consequently, dangers are generated is avoided.

Fixed connection between the driving shaft 4c and the first driving arm 2b is firm, specifically, the driving shaft locking device cooperates with the flat grooves 4c1 and 4c2 provided in the driving shaft 4c, and the first locking bolt 23 is used for locking, such that the front surface of the square fixing block 29 presses the flat grooves 4c1 and 4c2 in the driving shaft 4c, thereby ensuring firmness of the connection between the driving shaft 4c and the first driving arm 2b, and effectively avoiding relative sliding caused by connection loosening between the driving shaft 4c and the first driving arm 2b during long-term use. All the transmission shafts and the corresponding supporting arms or the driving arms are fixed by means of the first locking bolts 23, such that the transmission shafts and the supporting arms or the driving arms are integrated, and are firmer than the manner by which the transmission shafts are simply assembled in the shaft holes of the corresponding supporting arms or driving arms in a tightening manner. The shaft sleeves 22 and 30 made of special materials are arranged between all the transmission shafts and the shaft holes, and between the driving shaft 4c and the shaft holes, the shaft sleeves 22 and 30 have good self-lubricating effects, and therefore, abnormal sound caused by poor lubricating effects after long-term use is avoided. The first connecting rod 2d and the second connecting rod 3d each are connected to the pedal 5 by means of the connecting block 33, such that the stress between the pedal 5 and the first connecting rod 2d, and the stress between the pedal and the second connecting rod are not completely depended on the bolt, and the stress condition is transferred to the outer wall of the connecting block 33. Moreover, whether mounting positions of the driving support 2 and the driven support 3 are correct or not may also be detected after the connecting block 33 is used for auxiliary connection. For example, the first connecting rod 2d on the driving support 2 has been connected to the pedal 5, if the grooves in the second connecting rod 3d fail to just match the connecting block 33 in the corresponding position, it indicates that the mounting of the driven support 3 and the driving support 2 is wrong, and vice versa.

The embodiment further comprises at least one driven support 3, wherein the driven support 3 comprises the second transmission mechanism and the second connecting rod 3d, and the front end of the second connecting rod 3d is fixedly connected to the pedal 5. The driving support 2 drives the second transmission mechanism to be synchronously extended and retracted by means of the pedal 5, such that the second connecting rod 3d is synchronously extended and retracted.

It should be noted that the special supporting structure design, namely one driving support 2 and one driven support 3, is employed by the present invention. The driving support 2 is connected to the driving mechanism 4, and the driving mechanism 4 drives the driving support 2 to be retracted or extended, such that the driving support 2 and the driven support 3 are driven to synchronously act by the pedal 5. As shown in the state in FIG. 1, by taking the driving support 2 as an instance, the first driving arm 2b is attached to the first supporting arm 2c, in this case, the pedal mounted at the front end of the first connecting rod 2d is in a horizontal state or an angle between the pedal and a horizontal direction is very small, the stress of the first connecting rod 2*d* is gravity of the first connecting rod and force which is vertically downward and applied by the pedal 5, and all the force is vertical. When the driving support 2 is retracted in place, the driven support 3 is also retracted in place under an action of tractive force. Under influence of self-locking force of the gear box 4*b*, no force pulling outwards is generated or pulling force is very small, the self-locking force of the gear box 4*b* fails to be overcome, the risk that the driving support 2 and the driven support 3 are extended or extended to a certain degree is avoided, and a matching gap between the pedal 5 and the automobile body 1 is basically consistent.

It should be noted that the number of the driven support 3 is determined according to a length of the pedal 5 in an actual vehicle model. Generally, when the pedal 5 is relatively long, a double-supporting structure of the driving support 2 and the driven support 3 is employed, and a plurality of supporting structures composed of one driving support 2 and a plurality of driven supports 3 may also be employed.

The driving mechanism 4 comprises the driving motor 4*a* mounted at the bottom of the automobile body 1, the gear box 4*b* is mounted at the output end of the driving motor 4*a*, and the driving shaft 4*c* of the gear box 4*b* is connected to the first transmission mechanism.

The driving shaft 4*c* of the gear box 4*b* is directly connected to the first transmission mechanism, which omits the complex gear transmission mechanism, and reduces the manufacturing cost.

The first transmission mechanism comprises a first connecting base 2*a*, a first driving arm 2*b* and a first supporting arm 2*c*, the driving shaft 4*c* penetrates the first connecting base and is fixedly connected to one end of the first driving arm 2*b*, the other end of the first driving arm 2*b* is rotationally connected to the first connecting rod 2*d*, and two ends of the first supporting arm 2*c* are rotationally connected to the first connecting base 2*a* and the first connecting rod 2*d* respectively. The second transmission mechanism comprises the second connecting base 3*a*, the second driving arm 3*b* and the second supporting arm 3*c*, two ends of the second driving arm 3*b* are rotationally connected to the second connecting base 3*a* and the second connecting rod 3*d* respectively, and two ends of the second supporting arm 3*c* are rotationally connected to the second connecting base 3*a* and the second connecting rod 3*d* respectively.

The first connecting rod 2*d* and the second connecting rod 3*d* each are provided with a connecting lug 6, the connecting lug 6 is provided with the first shaft hole 10 and the second shaft hole 11 that are perpendicular to the connecting lug 6, and the axis of the first shaft hole 10 is parallel to the axis of the second shaft hole 11. The first connecting base 2*a* and the second connecting base 3*a* each are provided with a connecting plate 8, the connecting plate 8 is provided with the third shaft hole 12 and the fourth shaft hole 13 that are perpendicular to the connecting plate 8, and the axis of the third shaft hole 12 is parallel to the axis of the fourth shaft hole 13. One end of the first supporting arm 2*c* and one end of the second supporting arm 3*c* each are fixedly provided with a first transmission shaft 18, and the other ends each are fixedly provided with a second transmission shaft 19. The first transmission shaft 18 on the first supporting arm 2*c* cooperates with the first shaft hole 10 in the first connecting rod 2*d*, and the second transmission shaft 19 on the first supporting arm 2*c* cooperates with the third shaft hole 12 in the first connecting base. The second transmission shaft 18 on the second supporting arm 3*c* cooperates with the first shaft hole 10 in the second connecting rod 3*d*, and the second transmission shaft 19 on the second supporting arm 3*c* cooperates with the third shaft hole 12 in the second connecting base. One end of the first driving arm 2*b* and one end of the second driving arm 3*b* each are fixedly provided with a third transmission shaft 20, the third transmission shaft 20 on the first driving arm 2*b* cooperates with the second shaft hole 11 in the first connecting rod 2*d*, and the third transmission shaft 20 on the second driving arm 3*b* cooperates with the second shaft hole 11 in the second connecting rod 3*d*. The driving shaft 4*c* is fixedly connected to the other end of the first driving arm 2*b*, and the driving shaft 4*c* cooperates with the fourth shaft hole 13 in the first connecting base 2*a*. The other end of the second driving arm 3*b* is fixedly provided with a fourth transmission shaft 21, and two ends of the fourth transmission shaft 21 cooperate with the fourth hole 13 in the second connecting base 3*a*.

The first connecting base 2*a*, the first connecting rod 2*d*, the first driving arm 2*b*, and the first supporting arm 2*c* form a stable four-connecting-rod mechanism, which may achieve stable extension and retraction of the first connecting rod 2*d* under driving of the driving mechanism 4 so as to ensure the attitude of the pedal 5 in the retracted and extended states, that is, the upper surface of the pedal 5 is ensured to be substantially parallel to the ground, thereby ensuring that the force exerted on the first connecting rod 2*d* by the pedal 5 is vertically downward or substantially vertically downward in the retracted or extended state, and especially, the situation that the driving support 2 fails to be retracted in place in the retracted state due to generation of the horizontal outward force is avoided. In the same way, the second connecting base 3*a*, the second connecting rod 3*d*, the second driving arm 3*b*, and the second supporting arm 3*c* also form a stable four-connecting-rod mechanism. Since in the retracted or extended state, the pedal will not generate the horizontal outward force on the second connecting rod 3*d*, and therefore, the self-locking force of the gear box 4*b* on the driving supporting 2 is enough to ensure that the driven support 3 may be retracted in place.

Two ends of each of the first supporting arm 2*c* and the second supporting arm 3*c* are provided with a fifth shaft hole 14*a* for mounting the first transmission shaft 18 and a sixth shaft hole 14*b* for mounting the second transmission shaft 19 in a penetrating manner, one end of each of the first driving arm 2*b* and the second driving arm 3*b* is provided with a seventh shaft hole 15 for mounting the third transmission shaft 20 in a penetrating manner, the other end of the first driving arm 2*b* is provided with an eighth shaft hole 16 for mounting the driving shaft 4*c* in a penetrating manner, and the other end of the second driving arm 3*b* is provided with an eighth shaft hole 16 for mounting the fourth transmission shaft 21.

Two ends of the first supporting arm 2*c* each are provided with a transmission shaft rotating device, one end of the first driving arm 2*b* is provided with a transmission shaft rotating device, and the other end of the first driving arm is provided with a driving shaft locking device.

It should be emphasized that since the driving shaft 4*c* employs a detachable mounting manner and the corresponding driving arm, the mounting firmness of the driving shaft 4*c* directly affects the stability of an action of the driving support 2, and if mounting is not firm, abnormal sound may also be caused. Therefore, the driving shaft 4*c* locking device is arranged for the driving shaft 4*c* in the present invention.

The driving shaft locking device comprises a first locking bolt 23 and a square fixing block 29, a middle section of the driving shaft 4c is provided with flat grooves 4c1 and 4c2, and the end, connected to the driving shaft 4c, of the first driving arm 2b is provided with a first through hole 27 perpendicular to and coaxial with the eighth shaft hole 16. The square fixing block 29 is inserted into the circular shaft hole from one side of the first driving arm 2b, and the square fixing block cooperates with the flat grooves 4c1 and 4c2 in the driving shaft 4c. The square fixing block 29 is provided with a first threaded hole 25 coaxial with same, and the first locking bolt 23 is inserted into the first through hole 27 from the other side of the first driving arm 2b and is in threaded fit with the first threaded hole 25.

Since the torque borne by the driving shaft after the driving shaft 4c is fixedly connected to the first driving arm 2b is much greater than that of other transmission shafts, the driving shaft 4c locking device has a firmer locking function relative to the transmission shaft locking device, where the square fixing block 29 and the first locking bolt 23 are mounted on two sides of the first driving arm 2b respectively, and the front surface of the square fixing block 29 and the flat grooves 4c1 and 4c2 in the driving shaft 4c may be pressed more tightly by locking the first locking bolt 23, such that the driving shaft 4c and the first driving arm 2b are fixed more firmly.

A shaft sleeve 22 is arranged in each of the fifth shaft hole 14a, the sixth shaft hole 14b and the seventh shaft hole 15, and a shaft sleeve 30 is also arranged in the fourth shaft hole 13.

When the driving shaft 4c and various transmission shafts cooperatively operate with the corresponding shaft holes, a lubrication medium is usually required between the shafts and interiors of the holes for lubrication. Due to the fact that both the hole arms and the shafts are made of metal materials, under the condition that no continuous lubricating medium is supplemented, abrasion is caused by long-term friction between the shafts and the shaft holes, and abnormal sound is generated. In order to improve wear resistance of the shafts and the shaft holes is improved, special wear-resistant treatment needs be performed, such that a manufacturing process is more complex, and manufacturing cost is relatively increased. Therefore, the shaft sleeves 22 and the shaft sleeve 30 are mounted in all the shaft holes respectively, and the shaft sleeves 22 and the shaft sleeve 30 are made of special materials having self-lubricating effects, and since parts of the shaft sleeves 22 and the shaft sleeve 30 are relatively small, different materials may be used for other components, manufacturing and machining are easy, and a large amount of cost is reduced.

The side of the first connecting rod 2d facing the first supporting arm 2c and the side of the second connecting rod 3d facing the second supporting arm 3c each are provided with a sinking groove, and a shock pad 31 is mounted in the sinking groove.

It should be noted that the driving support 2 should have good stability when the pedal 5 stays in the retracted position or the extended position, and collision and impact between various components should be reduced as much as possible when the pedal reaches the retracted position or the extended position. The shock pad 31 is mounted on an inner side of the first connecting rod 2d, and is specifically towards one side of the first supporting arm 2c. When the pedal 5 is in the fully extended position, the first supporting arm 2c compresses the shock pad 31, in this case, the first connecting rod 2d, the shock pad 31, and the first supporting arm 2c are tightly attached, such that self-locking is achieved when the driving support 2 is in the extended positioning state, and the shock pad 31 reduces collision between the first supporting arm 2c and the first connecting rod 2d while ensuring the first connecting rod 2d to be tightly attached to the first supporting arm 2c. When the electric pedal is treaded for use, the gravity of downward treading is decomposed into force borne by the first connecting rod 2d and the first supporting arm 2c, stress of the first driving arm 2b is reduced, and the torsion on the driving shaft 4c of the first driving arm 2b is reduced, thereby improving stability of the driving mechanism 4, and prolong a service life. When the pedal 5 is retracted, the shock pad 31 on the first connecting rod 2d is also compressed by the first driving arm 2b, and the first connecting rod, the shock pad, and the first supporting arm are tightly attached, such that the driving support 2 is in another positioning state.

The driving support 2 and the driven support 3 should have good stability when the pedal 5 is in the extended position, and should have a self-locking function when reaching the extended position. Specifically, when the pedal 5 is in the fully extended position, the first supporting arm 2c compresses the shock pad 31, and in this case, the first connecting rod 2d, the shock pad 31, and the first supporting arm 2c are tightly attached, such that the self-locking is achieved when the driving support 2 and the driven support 3 are in the extended positioning state, a self-locking mechanism is formed at the corresponding position of the shock pad 31, and a user may step on the electric side pedal in a self-locking state.

A T-shaped groove 5a is provided in the pedal 5, a connecting block 33 having a T-shaped section is mounted in the T-shaped groove 5a, grooves cooperating with the connecting block 33 are provided at a front end of the first connecting rod 2d and a front end of the second connecting rod 3d, and a second threaded hole 26 for locking the pedal 5 is provided in the connecting block 33.

The first connecting rod 2d and the second connecting rod 3d each are connected to the pedal 5 by means of the connecting block 33, such that the stress between the pedal 5 and the first connecting rod 2d, and the stress between the pedal and the second connecting rod are not completely depended on the bolt, and the stress condition is transferred to the outer wall of the connecting block 33. Moreover, whether mounting positions of the driving support 2 and the driven support 3 are correct or not may also be detected after the connecting block 33 is used for auxiliary connection. For example, the first connecting rod 2d on the driving support 2 has been connected to the pedal 5, if the grooves in the second connecting rod 3d fail to just match the connecting block 33 in the corresponding position, it indicates that the mounting of the driven support 3 and the driving support 2 is wrong, and vice versa.

The angle between the upper surface of the pedal 5 and the ground facing inwards is 3-8 degrees in the retracted state, and in the extended state, the upper surface of the pedal is substantially parallel to the ground.

In an ideal state, when the pedal 5 is in the retracted position or in the extended position, the upper surface of the pedal is kept horizontal with the ground, and specifically, the acting force applied to the first connecting rod 2d and the second connecting rod 3d by the pedal 5 when external configuration is retracted may be kept vertically downward without generating horizontal force towards the outer side so as to ensure that the driving support 2 is tightened.

When the pedal 5 is in the retracted position and the extended position, an acute angle is formed between the upper surface of the pedal and the ground.

In the case where use is not affected, the upper surface of the pedal 5 may form a smaller angle with the ground when the pedal is in the retracted position and in the extended position.

More specifically, when the pedal 5 is in the retracted position, the angle of the upper surface of the pedal 5 being inclined inwards is 3-8 degrees, and in the extended position, the angle of the upper surface of the pedal 5 being inclined inwards is 0-5 degrees.

In order to ensure reliability of the pedal 5, an inclination direction of the upper surface of the pedal 5 is preferably inclined inwards, and when a foot sole of the user is wet and slippery, the user will not roll over because the upper surface of the pedal 5 is tilted outward. In order to ensure beauty of the extended state of the pedal 5, that is, the inclination angle of the pedal 5 is not too large to affect an appearance of the whole automobile, the angle of the upper surface of the pedal 5 being inclined inwards should be as small as possible, and the angle is preferably 0-5 degrees in this example.

The present invention relates to an electric pedal for an automobile. The electric pedal comprises a driving support, a driving mechanism and a pedal, where the driving support and the driving mechanism are both mounted on the same side of a bottom of an automobile body. The driving support comprises a first transmission mechanism and a first connecting rod, a front end of the first connecting rod is fixedly connected to the pedal, and the first transmission mechanism drives the first connecting rod to be extended and retracted. A driving shaft of the driving mechanism is directly fixedly connected to the first transmission mechanism and drives the first transmission mechanism to be extended and retracted, such that the first connecting rod is extended and retracted. When the first connecting rod is extended, the pedal is driven to move towards a lower side of an outer side of the automobile body, an angle between an upper surface of the pedal and a ground when the pedal is retracted is 3-8 degrees, and when the pedal is extended, the upper surface of the pedal is substantially parallel to the ground. The driving shaft of the driving mechanism of the present invention is directly connected to the first transmission mechanism of the driving support, such that a traditional gear transmission mechanism is omitted, manufacturing cost is reduced, and generation of abnormal sound is reduced. The angle between the upper surface of the pedal and the ground is 3-8 degrees when the pedal is in the retracted state, no horizontal outward force is generated, and it can be ensured that the pedal is retracted in place.

The above-mentioned contents are merely preferred examples of the present invention and are not intended to limit the implementation scope of the present invention, that is, all equivalent changes and modifications made according to the contents of the patent scope of the present invention shall fall within the technical scope of the present invention.

We claim:

1. An electric pedal for an automobile, comprising
a driving support (2), wherein the driving support (2) further comprises
a first transmission mechanism, the first transmission mechanism further comprisinging a first connecting base (2a), a first driving arm (2b), and a first supporting arm (2c), and
a first connecting rod (2d), wherein the first conneting rod (2d) is driven by the first transmission mechanism to extend and retract;
a driving mechanism (4), wherein the driving mechanism (4) further comprises
a driving motor (4a) mounted at a bottom of an automobile body (1),
a driving shaft (4c), and
a gear box (4b) mounted at an output end of the driving motor (4a); and
a pedal (5),
wherein the driving support (2) and the driving mechanism (4) are both mounted on same side of the bottom of the automobile body (1),
the driving shaft (4c) of the driving mechanism (4) is directly fixedly connected to the first transmission mechanism and drives the first transmission mechanism to be extended and retracted to further extend and retract the first connecting rod (2d),
the first connecting base (2a) further comprises a connecting plate (8) that is arranged on the first connecting base (2a) and provided with a third shaft hole (12) and a fourth shaft hole (13), the third shaft hole (12) and the fourth shaft hole (13) are perpendicular to the connecting plate (8), and an axis of the third shaft hole (12) is parallel to an axis of the fourth shaft hole (13),
the first driving arm (2b) is H-shaped with protrusions each at left and right edges of a front end and left and right edges of a back end, a pair of seventh shaft holes (15) are respectively provided on the two protrusions at the left and right edges of the back end for mounting a third transmission shaft (20) in a penetrating manner, a pair of eighth shaft holes (16) are respectively provided on the two protrusions at the left and right edges of the front end for mounting the driving shaft (4c) in a penetrating manner, and an axis of the seventh shaft holes (15) is parallel to an axis of the eighth shaft holes (16),
the first supporting arm (2c) is H-shaped with protrusions each at left and right edges of a front end and left and right edges of a back end, a pair of fifth shaft holes (14a) are respectively provided on the two protrusions at the left and right edges of the back end for mounting the first transmission shaft (18) in a penetrating manner, a pair of sixth shaft holes (14b) are respectively provided at the two protrusions at the left and right edges of the front end for mounting the second transmission shaft (19) in a penetrating manner, and an axis of the fifth shaft holes (14a) is parallel to an axis of the sixth shaft holes (14b),
the first connecting rod (2d) is T-shaped with a front portion in a form of a connecting lug (6), a first shaft hole (10) and a second shaft hole (11) run horizontally through the connecting lug (6) in a direction perpendicular to a longitudinal axis of the connecting lug (6), and an axis of the first shaft hole (10) is parallel to the axis of the second shaft hole (11),
the driving shaft (4c) penetrates the fourth shaft hole (13) of the first connecting base (2a) and is fixedly connected to the front end of the first driving arm (2b) through the pair of the eighth shaft holes (16) of the first driving arm (2b) through a driving shaft locking device,
the driving shaft locking device comprises a pair of first locking bolts (23) and a pair of corresponding square fixing blocks (29), the driving shaft (4c) comprises two flat grooves (4c1 and 4c2), the first driving arm (2b) comprises a pair of first through holes (27) and each of the first through holes (27) is perpendicular to and coaxial with one of the eighth shaft holes (16), each of the corresponding square fixing blocks (29) is inserted into one of the eighth shaft holes (16) from one side of the first driving arm (2b), the corredponding square fixing block (29) cooperates with the flat grooves (4c1 and 4c2) in the driving shaft (4c), each of the corresponding square fixing blocks (29) is provided with a first threaded hole (25) coaxial with same, and each of the first locking bolts (23) is inserted into one of the first through holes (27) from the other side of the first driving arm (2b) and is in threaded fit with the respective first threaded hole (25), the back end of the first driving arm (2b) is rotationally connected to the first connecting rod (2d) through the third transmission shaft (20) going through the pair of the seventh shaft holes (15) of the first driving arm (2b) and the second shaft hole (11) of the first connecting rod (2d), and a middle section of the third transmission shaft (20) is in interference fit with the second shaft hole (11) of the first connecting rod (2d) in a locked manner, the front end of the first supporting arm (2c) is rotationally connected to the first connecting base (2a) through the second transmission shaft (19) going through the pair of the sixth shaft holes (14b) of the first supporting arm (2c) and the third shaft hole (12) of the first connecting base (2a), and a middle section of the second transmission shaft (19) is in interference locking fit with the third shaft hole (12) of the first connecting base (2a) in a locked manner, the back end of the first supporting arm (2c) is rotationally connected to the first connecting rod (2d) through the first transmission shaft (18) going through the pair of the fifth shaft holes (14a) of the first supporting arm (2c) and the first shaft hole (10) of the first connecting rod (2d), and a middle section of the first transmission shaft (18) is in interference fit with the first shaft hole (10) of the first connecting rod (2d) in a locked manner, two ends of the first supporting arm (2c) are rotationally connected to the first connecting base (2a) and the first connecting rod (2d) respectively;

two ends of the first supporting arm (2c) each are provided with a transmission shaft rotating device, one end of the first driving arm (2b) is provided with a transmission shaft rotating device, and the other end of the first driving arm (2b) is provided with a driving shaft locking device;

the connecting lug (6) of the first connecting rod (2d) is fixedly connected to the pedal (5), when the first connecting rod (2d) moves from the retracted state to the extended state, the pedal (5) is driven to move towards a lower side of an outer side of the automobile body (1), an angle (28) between an upper surface of the pedal (5) and a ground (7) in the retracted state is 3-8 degrees, and the upper surface of the pedal is substantially parallel to the ground (7) in the extended state, and both the first driving arm (2b) and the first supporting arm (2c) rotate for more than 90° from the retracted state to the extended state, and the first driving arm (2b) and the first connecting rod (2d) are substantially aligned in a same horizontal plane, and the same horizontal plane is substantially parallel to the ground (7) in the extended state.

2. The electric pedal for an automobile according to claim 1, wherein
the back end of the first supporting arm (2c) is fixedly connected to the first transmission shaft (18), and the front end of the first supporting arm (2c) is fixedly connected to the second transmission shaft (19);

the first transmission shaft (18) on the first supporting arm (2c) cooperates with the first shaft hole (10) in the first connecting rod (2d);

the second transmission shaft (19) on the first supporting arm (2c) cooperates with the third shaft hole (12) in the first connecting base (2a);

the back end of the first driving arm (2b) is fixedly connected to the third transmission shaft (20), and the third transmission shaft (20) on the first driving arm (2b) cooperates with the second shaft hole (11) in the first connecting rod (2d); and the driving shaft (4c) cooperates with the fourth shaft hole (13) in the first connecting base (2a).

3. The electric pedal for an automobile according to claim 1, further comprising
a plurality of pairs of shaft sleeves (22),
wherein two ends of the first transmission shaft (18), two ends of the second transmission shaft (19), and two ends of the third transmission shaft (20) each rotationally cooperate with one pair of the shaft sleeves (22).

4. The electric pedal for an automobile according to claim 3, wherein each shaft sleeve (22) is arranged in each of the fifth shaft holes (14a), the sixth shaft holes (14b), and the seventh shaft holes (15), and
a shaft sleeve (30) is arranged in the fourth shaft hole (13).

5. The electric pedal for an automobile according to claim 1, further comprising
at least one driven support (3),
wherein the driven support (3) comprises a second transmission mechanism and a second connecting rod (3d), and a front end of the second connecting rod (3d) is fixedly connected to the pedal (5); and the driving support (2) drives the second transmission mechanism to be synchronously extended and retracted by means of the pedal (5), such that the second connecting rod (3d) is synchronously extended and retracted.

6. The electric pedal for an automobile according to claim 5, wherein structure of the driven support (3) is consistent with the driving support (2), that is, the driven support (3) is composed of a second connecting base (3a), a second driving arm (3b), a second supporting arm (3c) and a second connecting rod (3d) except the driving mechanism (4) and the driving shaft (4c), and the driving shaft (4c) is replaced with a fourth transmission shaft (21).

7. The electric pedal for an automobile according to claim 6, wherein the side of the first connecting rod (2d) facing the first supporting arm (2c) and the side of the second connecting rod (3d) facing the second supporting arm (3c) each are provided with a sinking groove, and a shock pad (31) is mounted in the sinking groove.

8. The electric pedal for an automobile according to claim 5, wherein a T-shaped groove (5a) is provided in the pedal (5), a connecting block (33) having a T-shaped section is mounted in the T-shaped groove (5a), grooves cooperating with the connecting block (33) are provided at a front end of the first connecting rod (2d) and a front end of the second connecting rod (3d), and a second threaded hole (26) for locking the pedal (5) is provided in the connecting block (33).

9. The electric pedal for an automobile according to claim 5, wherein when the pedal (5) is in a retracted position and an extended position, an acute angle is formed between the upper surface of the pedal and the ground (7).

10. The electric pedal for an automobile according to claim 5, wherein an angle (32) of the upper surface of the pedal (5) being inclined inwards is 0 to 5 degrees.

* * * * *